United States Patent
Rahimi et al.

(10) Patent No.: US 7,696,882 B1
(45) Date of Patent: Apr. 13, 2010

(54) READING CODES OF RFID TAGS INCOMING AT PREMISES AND REMOVING THEM LATER AS THEY EXIT

(75) Inventors: Kambiz Rahimi, Bellevue, WA (US); Christopher J. Diorio, Shoreline, WA (US); Ronald A. Oliver, Seattle, WA (US); Gregory T. Kavounas, Kirkland, WA (US)

(73) Assignee: Impinj, Inc., Seattle, WA (US)

( * ) Notice: Subject to any disclaimer, the term of this patent is extended or adjusted under 35 U.S.C. 154(b) by 310 days.

(21) Appl. No.: 12/018,937

(22) Filed: Jan. 24, 2008

Related U.S. Application Data

(60) Provisional application No. 60/902,748, filed on Feb. 21, 2007, provisional application No. 60/918,810, filed on Mar. 19, 2007, provisional application No. 60/920,970, filed on Mar. 30, 2007, provisional application No. 60/925,925, filed on Apr. 24, 2007.

(51) Int. Cl.
*G08B 13/14* (2006.01)

(52) U.S. Cl. .............. 340/572.4; 340/572.1; 340/571; 340/505; 705/29; 705/28

(58) Field of Classification Search .............. 340/572.1, 340/572.4, 568.1, 571, 505, 506, 521, 528; 235/375, 385; 705/1, 28, 29
See application file for complete search history.

(56) References Cited

U.S. PATENT DOCUMENTS

| 4,656,463 | A | 4/1987 | Anders et al. ............... 340/572 |
| 2008/0088450 | A1 | 4/2008 | Kwan .................... 340/572.01 |

OTHER PUBLICATIONS

Smart Card Alliance Identity Council. "Countless Smart Cards vs. EPC Gen 2 RFID Tags: Frequently Asked Questions." Smart Card Alliance (2006). Jul. 2006: 1-6.
Bridge Project eNewsletter. Building Radio Frequency Identification Solutions for the Global Environment May 2007: 1-8: http://www.bridge-project.eu.

*Primary Examiner*—George A Bugg
*Assistant Examiner*—Hongmin Fan
(74) *Attorney, Agent, or Firm*—Turk IP Law, LLC

(57) ABSTRACT

RFID reader systems, components, software and methods are provided for use premises that have RFID-tagged items. When a person comes onto an enclosure of the premises already carrying a personal tag, the incoming code of that personal tag is read. When later the person exits the enclosure, they could be transporting some of the items that have actionable codes. The actionable codes can be read, but the incoming code can be removed from them, before the actionable codes are acted upon, in Point-of-Sale or Electronic Article Surveillance systems.

47 Claims, 13 Drawing Sheets

PREMISES USING RFID SYSTEMS
THAT RESPECT THE PRIVACY OF CUSTOMERS

*RFID SYSTEM*

*RFID TAG*

*RFID READER SYSTEM DETAIL*

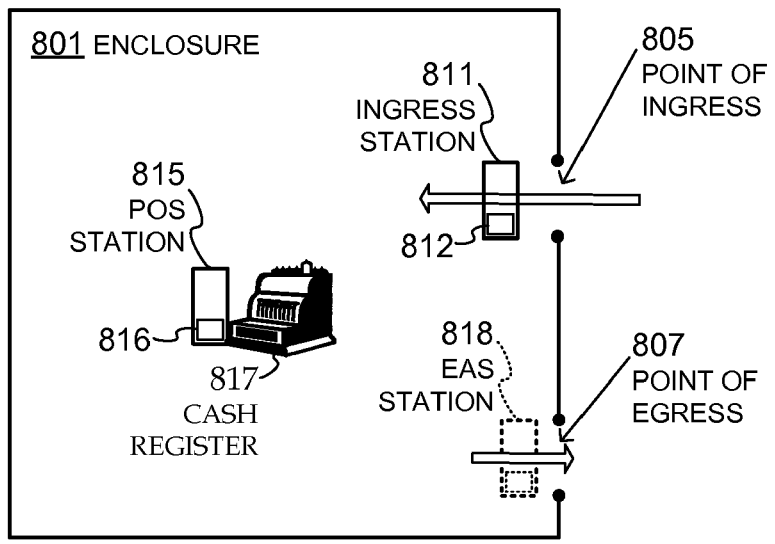
FIG. 8 *PREMISES USING RFID, AND WHERE THE EXIT STATION IS A POINT-OF-SALE (POS) STATION*
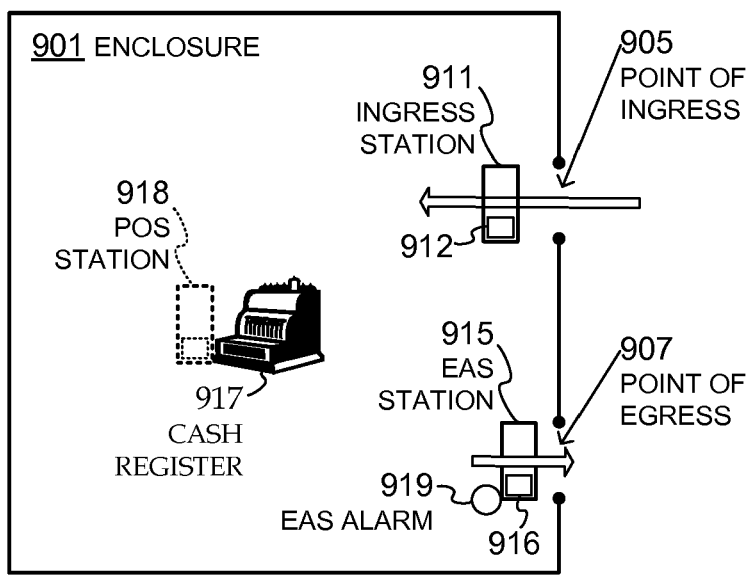
FIG. 9 *PREMISES USING RFID, AND WHERE THE EXIT STATION IS AN EAS STATION*

PREMISES USING RFID, AND WHERE THE EXIT STATION IS ALSO A POINT-OF-SALE (POS) STATION

PREMISES USING RFID, AND SHARED POINTS OF INGRESS AND EGRESS

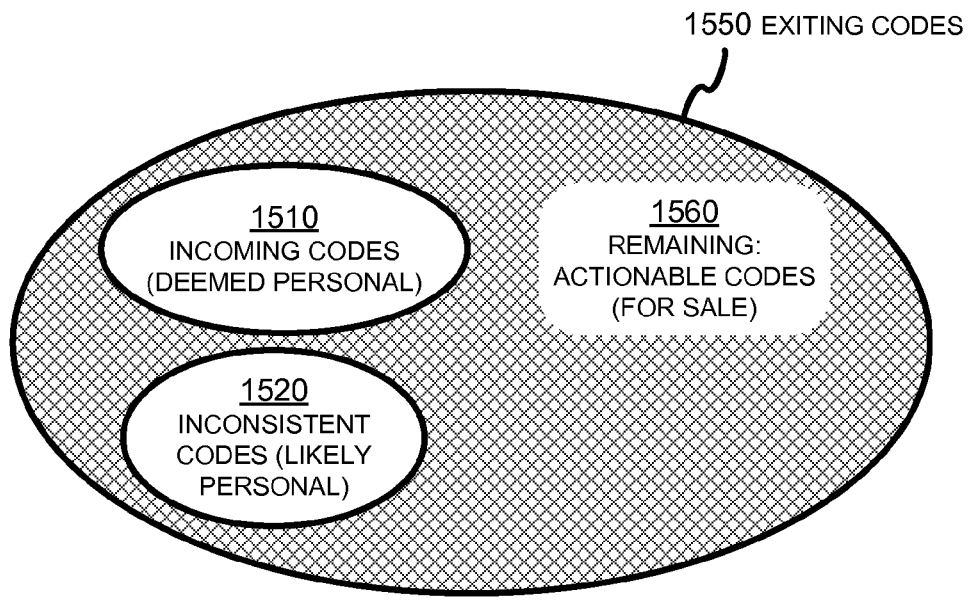
FIG. 15  *DERIVING ACTIONABLE CODES FOR POINT-OF-SALE STATION*
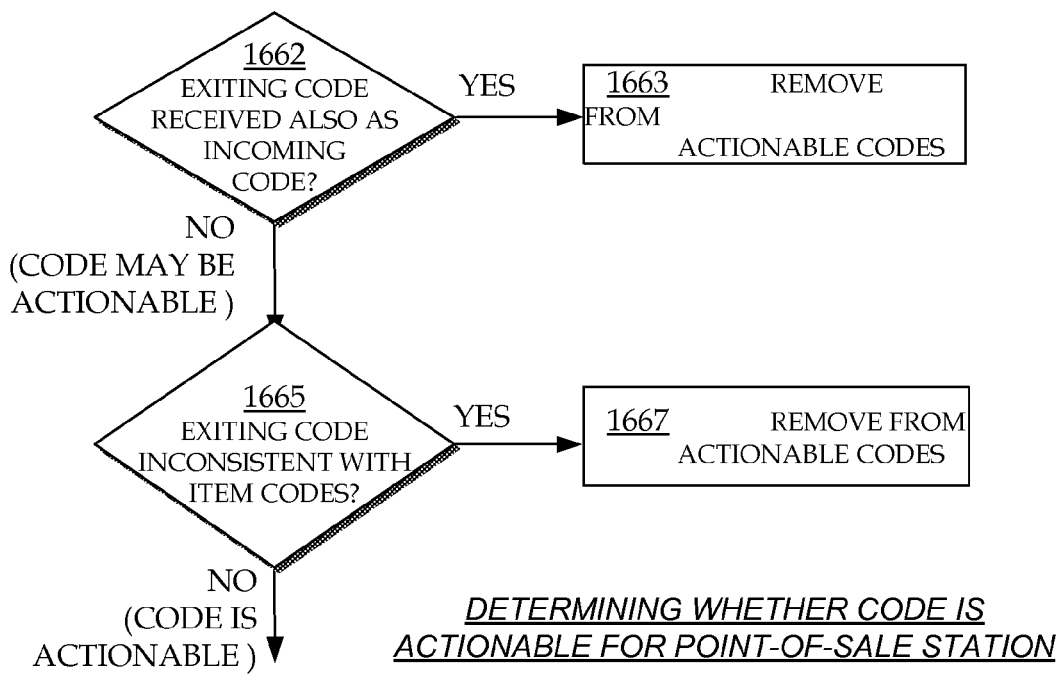
FIG. 16  *DETERMINING WHETHER CODE IS ACTIONABLE FOR POINT-OF-SALE STATION*

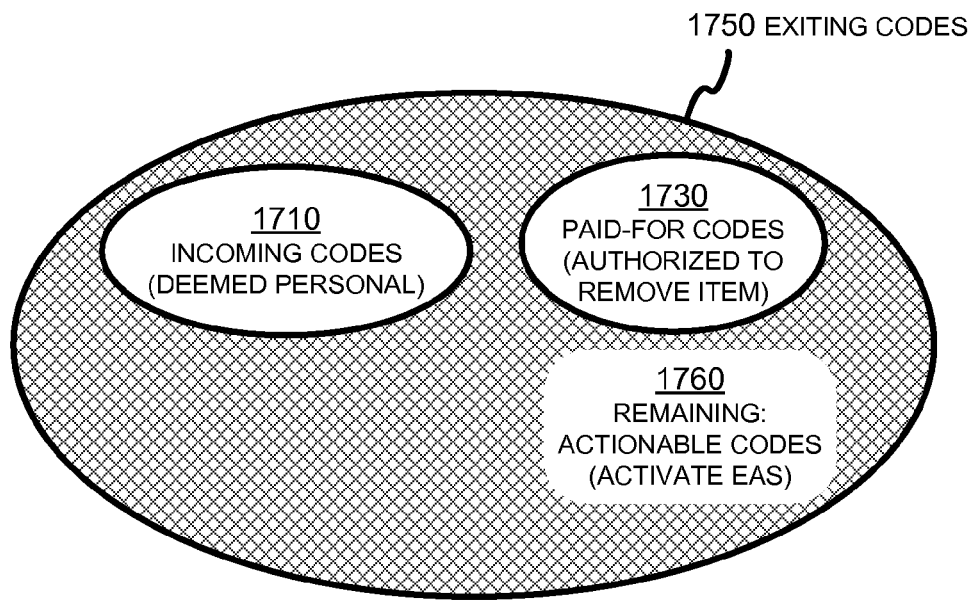
FIG. 17 — DERIVING ACTIONABLE CODES FOR POINT-OF-EGRESS (EAS) STATION
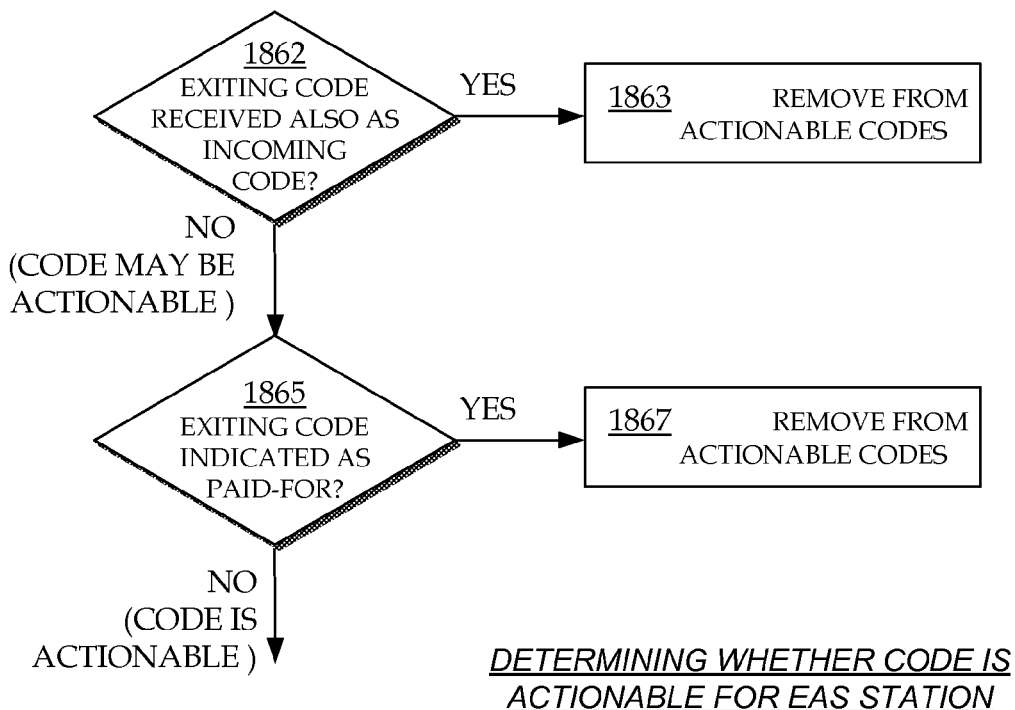
FIG. 18 — DETERMINING WHETHER CODE IS ACTIONABLE FOR EAS STATION

READING CODES OF RFID TAGS INCOMING AT PREMISES AND REMOVING THEM LATER AS THEY EXIT

RELATED APPLICATIONS

This application claims priority from U.S.A. Provisional Application Ser. No. 60/902,748 filed on 2007 Feb. 21, the disclosure of which is hereby incorporated by reference for all purposes.

This application claims priority from U.S.A. Provisional Application Ser. No. 60/918,810, filed on 2007 Mar. 19, the disclosure of which is hereby incorporated by reference for all purposes.

This application claims priority from U.S.A. Provisional Application Ser. No. 60/920,970, filed on 2007 Mar. 30, the disclosure of which is hereby incorporated by reference for all purposes.

This application claims priority from U.S.A. Provisional Application Ser. No. 60/925,925, filed on 2007 Apr. 24, the disclosure of which is hereby incorporated by reference for all purposes.

This application may be found to be related to commonly assigned U.S.A. patent application Ser. No. 12/019,030, titled "PREMISES ADAPTED TO READ CODES OF INCOMING RFID TAGS AND REMOVING THEM LATER AS THEY EXIT", initially filed with the USPTO on the same day as the instant application, having the same inventors.

FIELD OF THE INVENTION

The present description addresses the field of Radio Frequency IDentification (RFID) systems, and more specifically to premises and RFID technology and methods for using it, to deal with the possibility that person entering the premises already have on them readable RFID tags.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

It has been suggested that UHF RFID technology be used for tracking items within premises. Such premises include warehouses, stores, and other places where goods are handled. In particular, as further explained with reference to FIG. 6 of this document, it has been suggested that items can be tagged with RFID tags, and there can be RFID readers to read these tags. Upon so reading, the RFID readers can monitor the position of the tags, and therefore of the items, within the premises, or as they exit the premises. Such would substantially improve the internal operations of the premises, reducing operational costs, and resulting in savings that can be passed on to eventual consumers of the goods.

A problem arises upon recognizing that RFID readers installed at premises will be able to also read, in addition to tags of the items, tags that are foreign to the RFID environment of the premises. Such foreign tags are tags that may be carried by persons that come onto the premises for legitimate reasons, and can also be called personal tags. Such personal tags may have different functions. In some of the functions, such foreign tags can be unrelated to the operation of the premises, and yet such RFID readers at the premises could still be able to read the personal codes of these personal tags. This can confuse RFID-based Point-Of-Sale (POS) systems and Electronic Article Surveillance (EAS) systems.

BRIEF SUMMARY

Briefly, the present invention provides RFID reader systems, components, software and methods for use in premises that have RFID-tagged items. According to embodiments, when a person comes onto an enclosure of the premises already carrying a personal tag, the incoming code of that personal tag is read. When later the person exits the enclosure, they could be transporting some of the items that have actionable codes. The actionable codes can be read, but the incoming code can be removed from them, before the actionable codes are acted upon.

In warehouse-type embodiments, the actionable codes can be used to activate an Electronic Article Surveillance (EAS) system, to prevent theft. This can reduce operational costs, which can result in savings to be passed on to the consumers in the form of lower prices.

In retail-type embodiments, the actionable codes can be used to either activate an EAS system, or to operate Point-Of-Sale (POS) systems for customers, or even both. In fact, tagging items with UHF RFID tags for the consumer goods chain can make it unnecessary for such items to be separately, additionally tagged with special-purpose EAS tags, as they are today.

An advantage of some embodiments is that a personal tag will not trigger an RFID system of the premises when it should not. Thus, due to the personal tag, a sale that should not be registered at a POS station will not be so registered. Moreover, an alarm that should not be activated at an EAS station will not be so activated.

In some embodiments, the personal codes are further discarded without ever looking up what they mean. This way, consumer privacy is better protected.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which:

FIG. 8 is a plan view of premises according to embodiments, in which an exit station is implemented by a Point-Of-Sale (POS) station.

FIG. 9 is a plan view of premises according to embodiments, in which an exit station is implemented by an Electronic Article Surveillance (EAS) station.

FIG. 15 is a diagram for illustrating how actionable codes can be derived for an operation of the method of FIG. 12, as applied to a POS station according to another embodiment.

FIG. 16 is an embodiment of a flowchart segment for the derivation of FIG. 15, as applied to a single exiting code.

FIG. 17 is a diagram for illustrating how actionable codes can be derived for an operation of the method of FIG. 12, as applied to an EAS station according to an embodiment.

FIG. 18 is an embodiment of a flowchart segment for the derivation of FIG. 17, as applied to a single exiting code.

DETAILED DESCRIPTION

Figure 1:
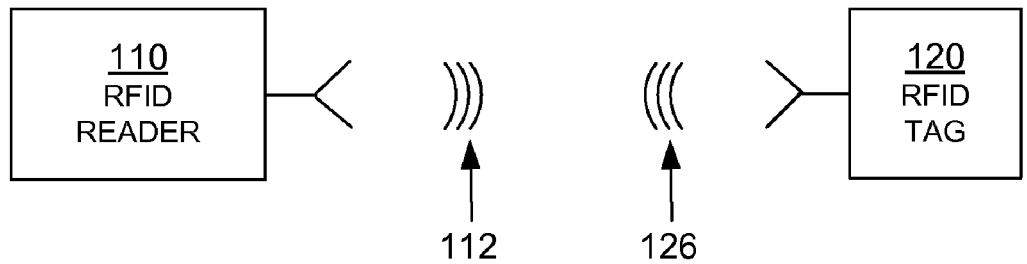
FIG. 1 is a block diagram of components of an RFID system.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment, an entirely firmware embodiment, or an embodiment combining aspects of the above. This description is, therefore, not to be taken in a limiting sense.

The invention is now described in more detail.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
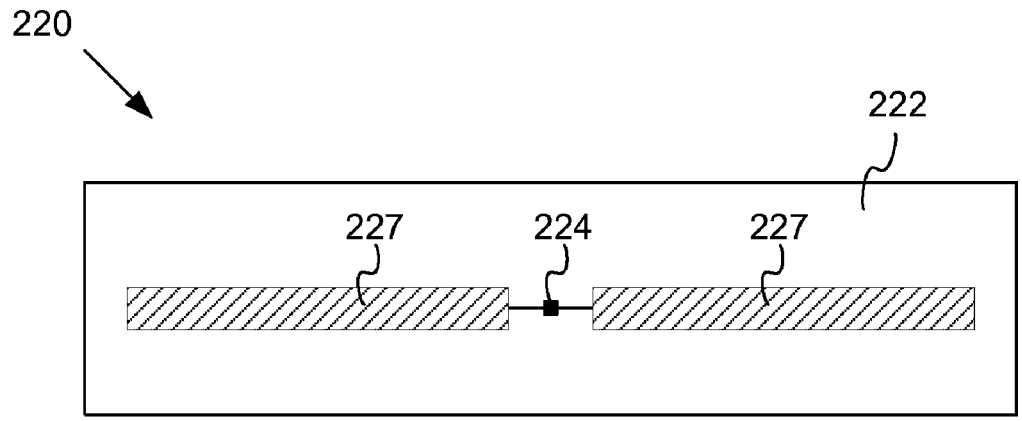
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
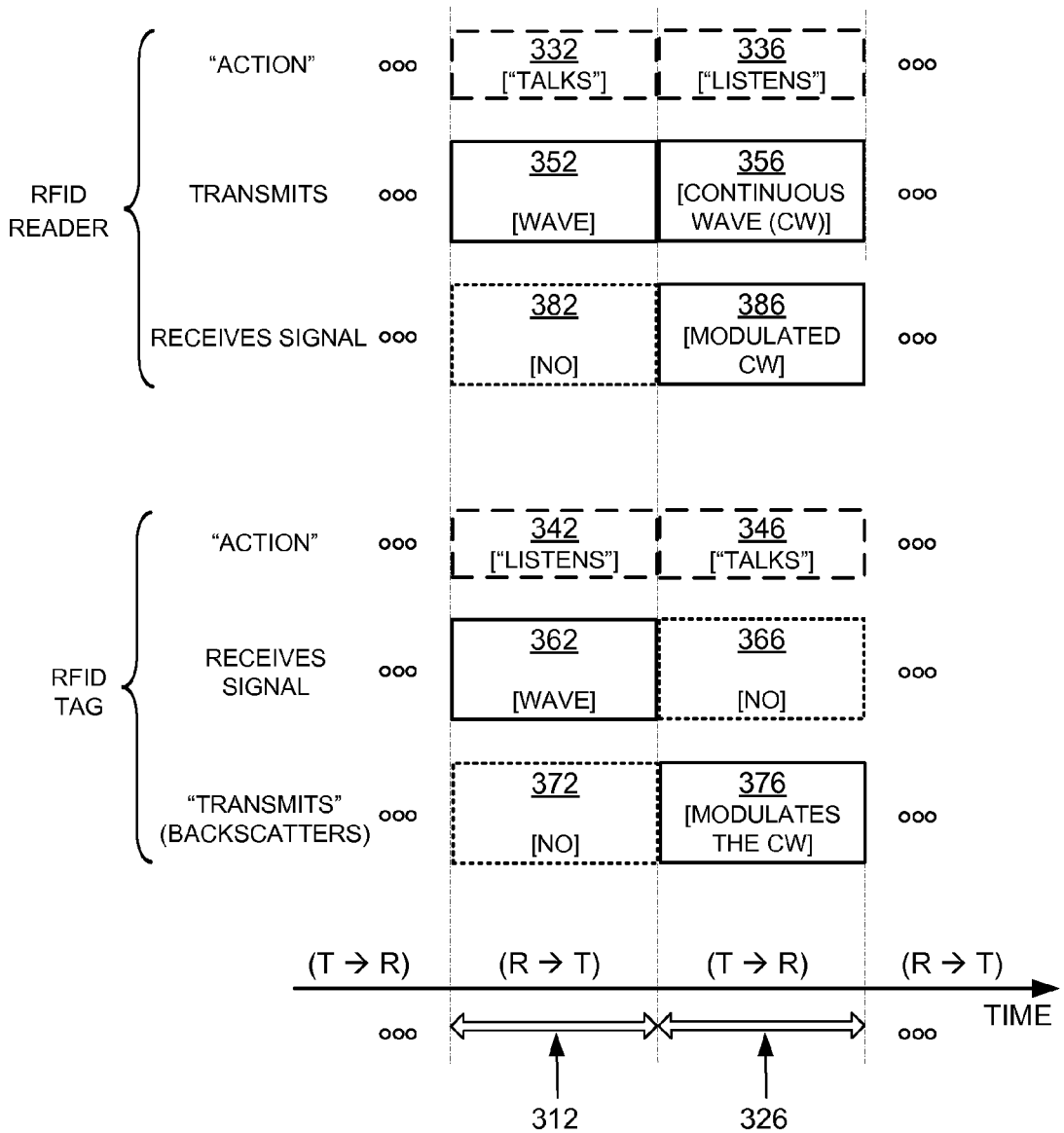
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

Figure 4:
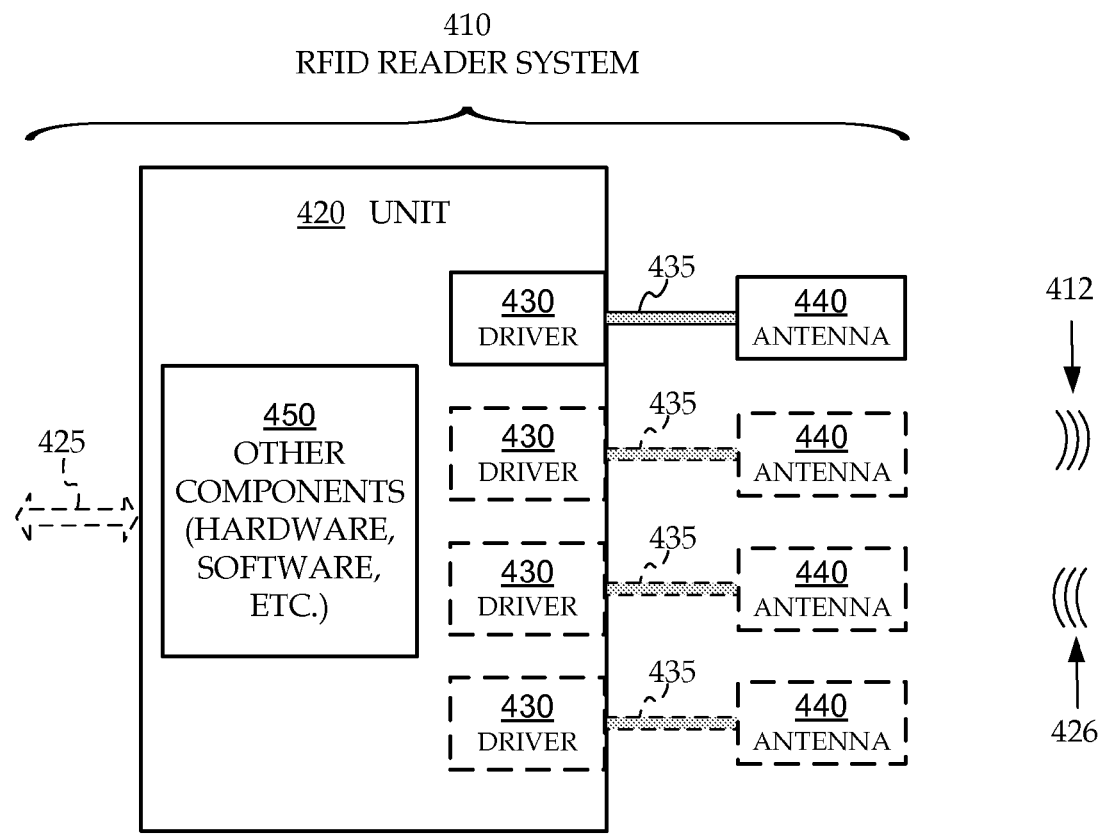
FIG. 4 is a block diagram showing a detail of an RFID reader system, such as the one shown in FIG. 1.

FIG. 4 is a block diagram showing a detail of an RFID reader system 410, which can be the same as reader 110 shown in FIG. 1. A unit 420 is also known as a box 420, and has at least one antenna driver 430. In some embodiments it has four drivers 430. For each driver 430 there is an output, which is typically a coaxial cable plug. Accordingly cables 435 can be attached to the outputs of the provided respective drivers 430, and then the cables 435 can be attached to respective antennas 440.

A driver 430 can send to its respective antenna 440 a driving signal that is in the RF range, which is the reason for choosing a coaxial cable for cable 435. The driving signal causes antenna 440 to transmit an RF wave 412, which is analogous to RF wave 112 of FIG. 1. In addition, RF wave 426 can be backscattered from the RFID tags, analogous to RF wave 126 of FIG. 1. Backscattered RF wave 426 then ultimately becomes a signal sensed by driver 430.

Unit 420 also has other components 450, such as hardware and/or software and/or firmware, which may be described in more detail later in this document. Components 450 control drivers 430, and as such cause RF wave 412 to be transmitted, and the sensed backscattered RF wave 426 to be interpreted. Optionally and preferably there is a communication link 425 to other equipment, such as computers and the like, for remote operation of system 410.

Figure 5:
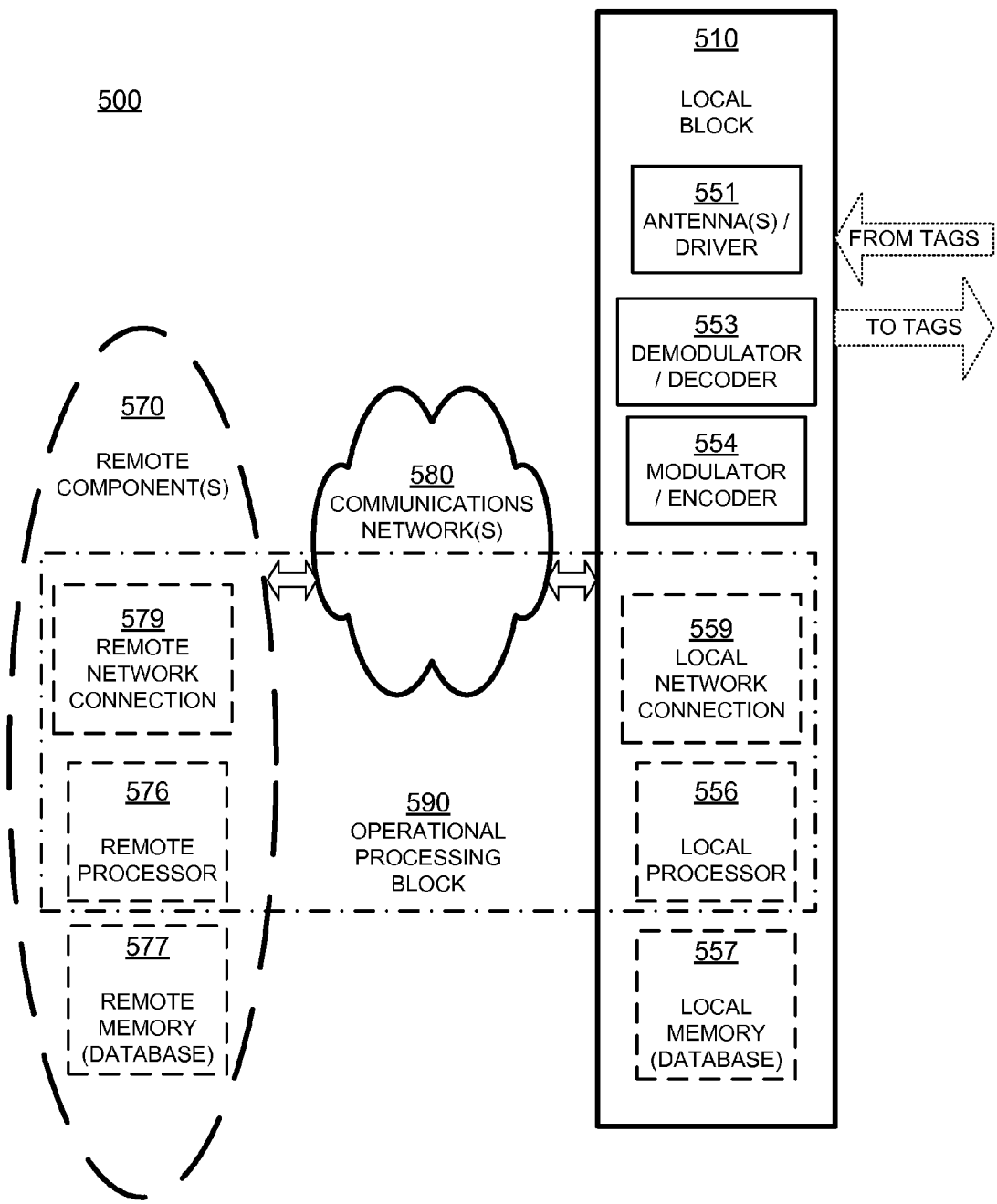
FIG. 5 is a block diagram of a whole RFID reader system according to embodiments.

FIG. 5 is a block diagram of a whole RFID reader system 500 according to embodiments. System 500 includes a local block 510, and optionally remote components 570. Local block 510 and remote components 570 can be implemented in any number of ways. It will be recognized that reader 110 of FIG. 1 is the same as local block 510, if remote components 570 are not provided. Alternately, reader 110 can be implemented instead by system 500, of which only the local block 510 is shown in FIG. 1. Plus, local block 510 can be unit 420 of FIG. 4.

Local block 510 is responsible for communicating with the tags. Local block 510 includes a block 551 of an antenna and a driver of the antenna for communicating with the tags. Some readers, like that shown in local block 510, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 553 demodulates and decodes backscattered waves received from the tags via antenna block 551. Modulator/encoder block 554 encodes and modulates an RF wave that is to be transmitted to the tags via antenna block 551.

Local block 510 additionally includes an optional local processor 556. Processor 556 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 553, the encoding function in block 554, or both, may be performed instead by processor 556.

Local block 510 additionally includes an optional local memory 557. Memory 557 may be implemented in any number of ways known in the art. Such ways include, by way of examples and not of limitation, nonvolatile memories (NVM), read-only memories (ROM), random access memories (RAM), any combination of one or more of these, and so on. Memory 557, if provided, can include programs for processor 556 to run, if provided.

In some embodiments, memory 557 stores data read from tags, or data to be written to tags, such as Electronic Product Codes (EPCs), Tag Identifiers (TIDs) and other data. Memory 557 can also include reference data that is to be compared to the EPC codes, instructions and/or rules for how to encode commands for the tags, modes for controlling antenna 551, and so on. In some of these embodiments, local memory 557 is provided as a database.

Some components of local block 510 typically treat the data as analog, such as the antenna/driver block 551. Other components such as memory 557 typically treat the data as digital. At some point there is a conversion between analog and digital. Based on where this conversion occurs, a whole reader may be characterized as "analog" or "digital", but most readers contain a mix of analog and digital functionality.

If remote components 570 are indeed provided, they are coupled to local block 510 via an electronic communications network 580. Network 580 can be a Local Area Network (LAN), a Metropolitan Area Network (MAN), a Wide Area Network (WAN), a network of networks such as the internet, and so on. In turn, local block 510 then includes a local network connection 559 for communicating with network 580.

There can be one or more remote component(s) 570. If more than one, they can be located at the same location, or in different locations. They can access each other and local block 510 via network 580, or via other similar networks, and so on. Accordingly, remote component(s) 570 can use respective remote network connections. Only one such remote network connection 579 is shown, which is similar to local network connection 559, etc.

Remote component(s) 570 can also include a remote processor 576. Processor 576 can be made in any way known in the art, such as was described with reference to local processor 556.

Remote component(s) 570 can also include a remote memory 577. Memory 577 can be made in any way known in the art, such as was described with reference to local memory 557. Memory 577 may include a local database, and a different database of a Standards Organization, such as one that can reference EPCs.

Of the above-described elements, it is advantageous to consider a combination of these components, designated as operational processing block 590. Block 590 includes those that are provided of the following: local processor 556, remote processor 576, local network connection 559, remote network connection 579, and by extension an applicable portion of network 580 that links connection 559 with connection 579. The portion can be dynamically changeable, etc. In addition, block 590 can receive and decode RF waves received via antenna 551, and cause antenna 551 to transmit RF waves according to what it has processed.

Block 590 includes either local processor 556, or remote processor 576, or both. If both are provided, remote processor 576 can be made such that it operates in a way complementary with that of local processor 556. In fact, the two can cooperate. It will be appreciated that block 590, as defined this way, is in communication with both local memory 557 and remote memory 577, if both are present.

Accordingly, block 590 is location agnostic, in that its functions can be implemented either by local processor 556, or by remote processor 576, or by a combination of both. Some of these functions are preferably implemented by local processor 556, and some by remote processor 576. Block 590 accesses local memory 557, or remote memory 577, or both for storing and/or retrieving data.

Reader system 500 operates by block 590 generating communications for RFID tags. These communications are ultimately transmitted by antenna block 551, with modulator/encoder block 554 encoding and modulating the information on an RF wave. Then data is received from the tags via antenna block 551, demodulated and decoded by demodulator/decoder block 553, and processed by processing block 590.

Figure 6:
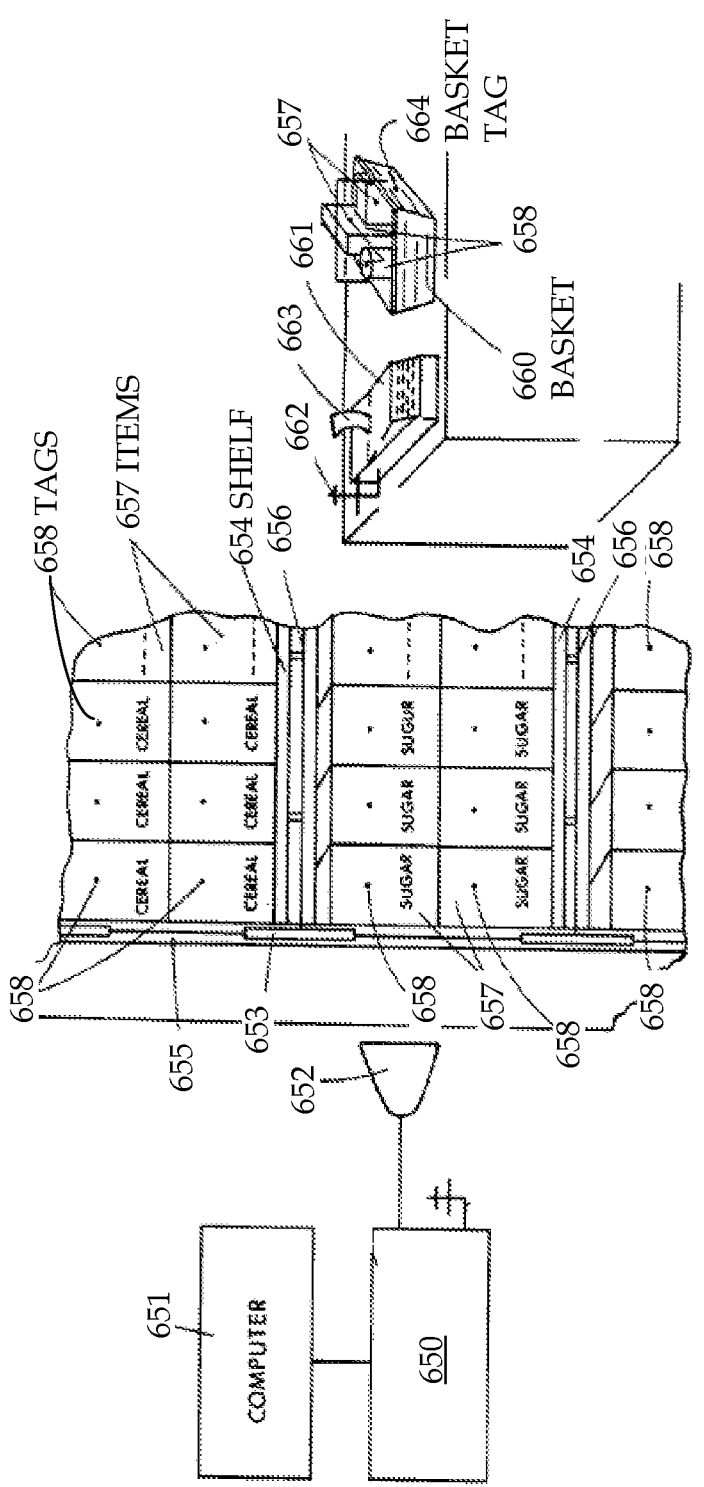
FIG. 6 is a diagram showing a prior art implementation for a Point-Of-Sale (POS) arrangement.

FIG. 6 is a diagram from prior art U.S. Pat. No. 4,656,463, which is hereby incorporated by reference. In fact, in that patent it is shown as FIG. 11, but that figure number and related reference numerals have been changed to comport with the description of this document. The following description of FIG. 6 is adapted from that prior art patent:

FIG. 6 has a left-hand side and a right-hand side. The left-hand side depicts a cut-away modular shelving system and a system for use in supermarkets, pharmacies, service stations, libraries, plant inventory control units, and other locations where products for sale or distribution are stacked on shelves and removed periodically by customers, clients and clerks. As shown, the system is described for use in a grocery store, but can be used elsewhere with appropriate minimal modification, e.g., parts, supply rooms for a production line, or explosives control in a mine.

In the left-hand side, a constant shelf-by-shelf and item-by-class inventory is maintained by a system 650, which utilizes computer 651 for data storage and processing. System 650 is wired to parabolic antennas 652 placed on the ceiling of the store in predetermined patterns or repeater-relays 652 which are preferably positioned in or under the ceiling of the facility in a predesigned pattern required by the radar-range equation for radio contact with the repeater-relays 653 attached to the modular shelving 654 attached to vertical supports 655. Attached to repeater-relays 653 are antennas 656 suspended from the bottom of each shelf 654.

Inventory counting control is provided by utilizing system 650 to periodically broadcast through antennas 652 codes incorporating product identity and pricing to RFID tags 658 on goods 657 stacked on shelves 654. Tags 658 are called passive transceivers ("PT"), and described in that patent as RFID tags. The interrogated RFID tags 658 broadcast a response signal, which is picked up by antenna 656 and broadcast by repeater-relay 653 to antennas 652. Computer 651 then counts the numbers of items on the shelf, and provides stocking equipment or personnel with notice when the supply of particular goods on the shelves 654 are below pre-set minimums.

System 650 can reset pricing information by erasing the pricing section of the coded information previously encoded in tags 658, and broadcasting new price data. In a different system, similar to that utilized in bar-coding, no pricing information is encoded on tags 658. The later described unit 661 contains an up-to-date pricing schedule periodically broadcast by system 650. When the particular goods are placed in the predetermined proximity of unit 661, the bill or credit document is computed from the codes entered by tags 658 and the previously stored pricing data.

In FIG. 6, the right-hand side depicts a Point Of Sale ("POS") system in the prior art. Items in stock are removed from inventory when goods 657 in shopping basket 660 are positioned in predetermined locations adjacent check-out unit 661. Check-out unit 661 interrogates tags 658 of goods 657, determines the relevant pricing data, and broadcasts a signal through antenna 662 to antenna 652 of system 650 to print the bill 663, deleting the goods 657 from inventory and decode tags 658, to the extent permitted by the system when a clerk presses a button on register unit 661 indicating that payment for the goods has been made.

Market basket 660 has an attached tag 664. Tags 658 are periodically, e.g. once per two minutes, interrogated through antennas 652, to determine their movement through the store. As tags 658 are interrogated, computer 650 matches their removal from shelves 654 with the route of market basket 660, and correlates the removal of an item 657 with the location of market basket 660. As market basket 660 approaches the check-out counter, check-out unit 661 immediately interrogates tags 658 of items 657 in market basket 660, to determine whether items removed along the line of travel of market basket 660 are in the basket, whether the items are in other baskets, whether the items have been placed on other shelves within the store, or have, effectively, disappeared.

As has been mentioned, embodiments of the invention include premises. Premises, for purposes of this document, can include a building, together with its grounds, inside and outside, or other appurtenances.

Figure 7:
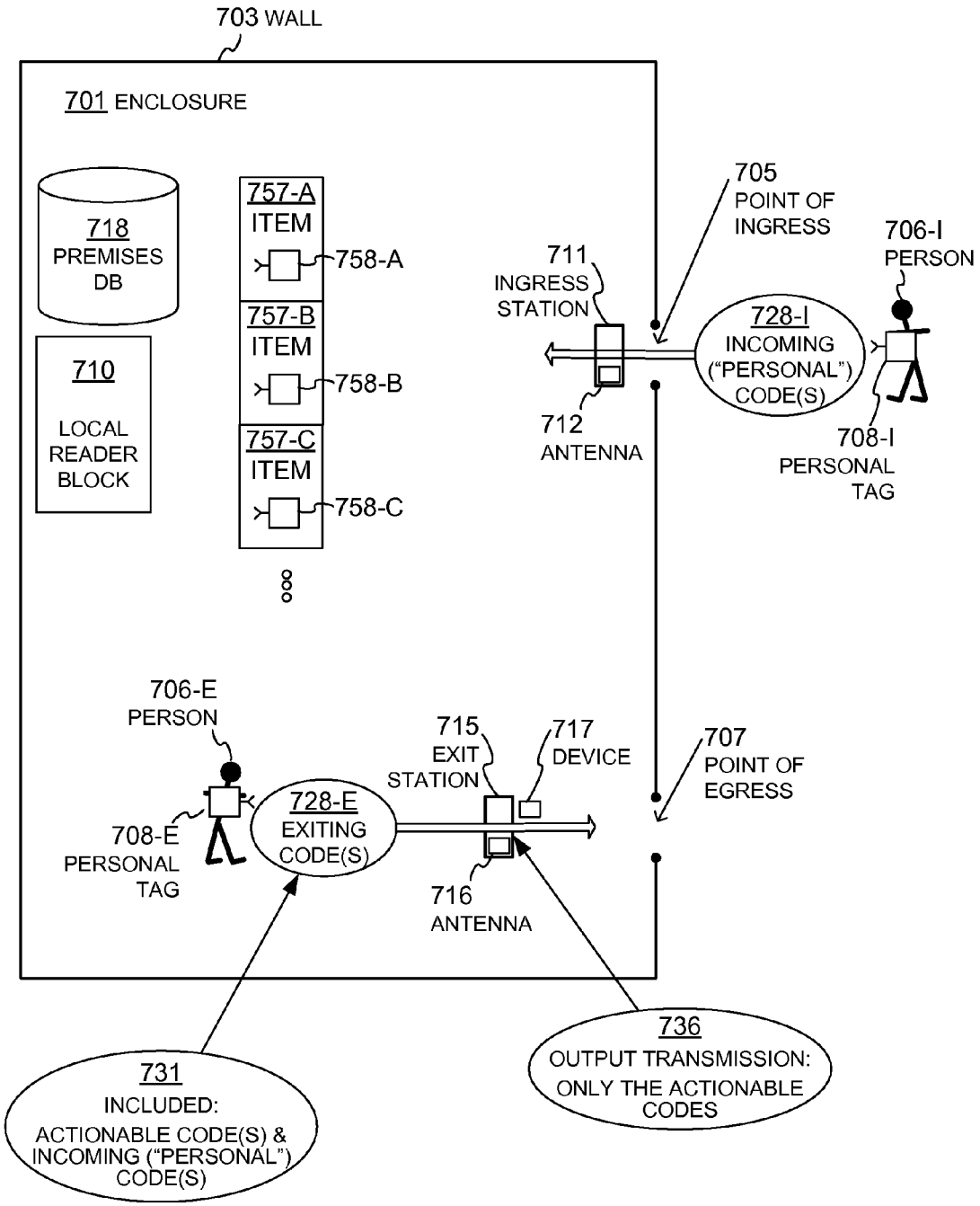
FIG. 7 is a plan view of premises with an RFID system that respects privacy of its customers, according to embodiments.

Referring to FIG. 7, premises according to embodiments are now described. The premises include an enclosure 701, such as that of a building. In addition, the premises can include a parking lot, etc.

Enclosure 701 can be a warehouse, a retail store, a distribution center, and so on. It can be made or defined by one or more walls 703, and can have entrances and exits. By walls in this document, it is meant external walls, internal walls, or any separations that define the enclosure, and through which people cannot walk, as opposed to the entrances and exits. Such separations can include even short fences, ropes, and markings on the ground. So, such walls could even be brand display areas within a larger store, and so on.

In the particular embodiment of FIG. 7, enclosure 701 has a point of ingress 705 for entering, and a point of egress 707 for exiting, as also shown by arrows. There can be a number of configurations of points of ingress and points of egress, as will be explained in more detailed later in this document.

There are items within enclosure 701. Only three items 757-A, 757-B, 757-C are shown, so as to not unnecessarily clutter the drawing. In practical embodiments, there may be many such items. These items can be within enclosure 701 for storage, for sale, for distribution, and so on, depending on the embodiment.

Items 757-A, 757-B, 757-C are tagged with item RFID tags 758-A, 758-B, 758-C, respectively. These item RFID tags 758-A, 758-B, 758-C can also be called native tags, and their codes native codes. This is to distinguish them from foreign tags and foreign codes, which people might bring in as their personal tags. These item RFID tags 758-A, 758-B, 758-C can be made in any suitable way, such as described above.

In the particular embodiment of FIG. 7, an incoming person 706-I is entering enclosure 701. Person 706-I could be a worker, if enclosure 701 is a warehouse or a retail space. Alternately, person 706-I could be a customer, if enclosure 701 is a retail space.

The premises of FIG. 7 further include an optional ingress station 711 near point of ingress 705, near which person 706-I may pass upon entering. Station 711, in embodiments where it is provided, can be merely a post, a portal, or have a structure suitably adjusted for its function.

Further in the particular embodiment of FIG. 7, an exiting person 706-E is preparing to leave enclosure 701. FIG. 7 can be considered to be a snapshot, where a person 706-I is presently entering enclosure 701, at about the same time as another person 706-E is also preparing to leave enclosure 701. In other embodiments, FIG. 7 can be considered over some time, and where a formerly entering person 706-E is the same as person 706-I, who is presently preparing to leave some time after entering.

The premises of FIG. 7 further include an optional exit station 715 associated with point of egress 707, near which person 706-E may pass upon preparing to leave. As will be seen later in this document, exit station 715 can be implemented in a number of ways, such as by a Point Of Sale (POS) station, an Electronic Article Surveillance (EAS) station, and so on. Station 715, in embodiments where it is provided, can be merely a post, a portal, or include suitable elements for its function.

Upon leaving enclosure 701, person 706-E could be transporting none of the above described items in enclosure 701, such as items 757-A, 757-B, 757-C, as shown. Alternately, person 706-E could be transporting some of these above described items, with or without authorization from the operator of enclosure 701. The operator can be a manager, or organization acting in such a capacity.

The premises of FIG. 7 further include a device 717. Device 717 is intended for use when one of the items is removed from the enclosure. Device 717 may be implemented in any number of ways, and preferably in association with exit station 715. For example, in embodiments where exit station 715 is a POS station, device 717 can include a cash register.

In embodiments where exit station 715 is an EAS station, device 717 can include an alarm for notifying that one of the items is being removed without authorization.

The alarm can be implemented in a number of locations. For example, it can be either at the EAS station, as shown, or at a place other than the EAS station, e.g. at a manager's desk. Or it can be in multiple places.

The alarm can be implemented in a number of ways. Some such ways include a light that can light, a speaker that can emit a sound or even a message, a display monitor that can display a warning message, a description of the item, and so on.

The premises of FIG. 7 further include an RFID reader system according to embodiments. The reason is to read exiting codes of items, if any, as person 706-E is preparing to leave enclosure 701. This way, such codes could be reported to a database 718 of the premises, for purposes of inventory control.

The RFID reader system includes a local reader block 710, for reading the exiting codes of items. Block 710 can be similar to what was described above for local block 510, but with additional functionality called for by embodiments. Or mere components of block 710 can be provided, which incorporate the additional functionality, such as a processor.

In addition, the RFID reader system can include one or more RFID reader antennas. By way of example only, and only for the sample configuration of enclosure 701, the RFID reader system includes a reader antenna 712 installed at ingress station 711, and another reader antenna 716 installed at exit station 715. Different configurations are possible, as will be illustrated in more detail later in this document.

As seen in FIG. 7, incoming person 706-I carries a personal RFID tag 708-I. Only one personal tag 708-I is shown, although more such personal tags could be carried. Personal tag 708-I could be a tag from an item they may have purchased in a different store, or a tag on an item they may be carrying always, such as an RFID-tagged mobile phone, another device, and so on. Of course, by saying that person 706-I carries a personal RFID tag 708-I, it is meant that they carry it on their person, or also by other means, such as a buggy, basket, hand truck, dolly, etc.

Personal tag 708-I has an incoming code 728-I, which can be read via antenna 712. Personal tag 708-I can also be called a foreign tag, in that it is foreign to the environment of the premises. Incoming code 728-I can also be called a foreign code. As will be seen below, embodiments can result in code 728-I not being used by the operator of the premises to learn private information about person 706-I.

Person 706-E carries a personal RFID tag 708-E, similar to what was described above for tag 708-I. As person 706-E passes near antenna 716, one or more exiting codes 728-E are read from them. According to comment 731, exiting codes 728-E can include so-called actionable codes. Such actionable codes can be codes for items to be paid for, if exit station 715 is a POS station, or codes of items that are being removed from enclosure 701 without authorization, if exit station 715 is an EAS station.

Further according to comment 731, exiting codes 728-E can include one or more personal codes, such as code 728-I. According to embodiments, the RFID reader system is capable of deriving the actionable codes by removing the incoming code from the exiting codes. According to comment 736, an output transmission is generated responsive to only the actionable codes.

In some embodiments, device 717 is operable responsive to the output transmission. For example, where the exiting codes are read from a Point-Of-Sale station 715, device 717 can include a cash register. The output transmission can include at least some of the actionable codes, for generating a sales report for the cash register, for the customer to pay.

For another example, where the exiting codes are read from an EAS station 715, device 717 can include there an alarm as described above. In these cases, this alarm is sometimes called an EAS alarm. The output transmission can cause the alarm to be activated, for notification.

In FIG. 7, point of ingress 705 and point of egress 707 are at the outer perimeter of enclosure 701. In some instances, an enclosure can have a sub-enclosure, which the person must enter at some point to have access to the items. In such instances, the points of ingress and egress can be understood in terms of entering and exiting the sub-enclosure, for purposes of this document. In all instances, points such as points of ingress and egress may be implemented by suitable gates, doors, etc.

To summarize, incoming code 728-I of personal RFID tag 708-I and native codes of RFID tags 758-A, 758-B, and 758-C may include any data stored by the respective tags such as EPC, TID, or other data. Personal RFID tag 708-I maybe any tag on the person of incoming person 706-I such as tags associated with items purchased at a different store, tags associated with devices (e.g. a tagged mobile phone), and the like. Exiting codes 728-E include any data (EPC, TID, etc.) stored by tags associated with an exiting person. As such, exiting codes 728-E may include incoming code 728-I and codes stored by tags associated with any items picked up by the person before exiting the premises.

In some of these embodiments, as in those of FIG. 7, there are at least two points of ingress and egress. The incoming code can be read via a first antenna, while the exiting codes have been read via a second a Other configuration embodiments are now described. In some of these embodiments, as in those of FIG. 7, there are at least two points of ingress and egress. The incoming code can be read via a first antenna, while the exiting codes have been read via a second antenna. In some instances, persons are allowed to use all points for both entering and exiting, while in others customers can be directed to use different points for entering than exiting. Examples are now described.

FIG. 8 is a plan view of premises according to embodiments, in which an enclosure 801 has a point of ingress 805, and a point of egress 807. An ingress station 811 is near point of ingress 805, and has installed thereon an antenna 812. Moreover, enclosure 801 has an exit station that is implemented by a Point-Of-Sale (POS) station 815. POS station 815 includes a cash register 817, and has installed thereon an antenna 816. An EAS station 818 is optional but not always provided at point of egress 807.

FIG. 9 is a plan view of premises according to embodiments, in which an enclosure 901 has a point of ingress 905, and a point of egress 907. An ingress station 911 is near point of ingress 905, and has installed thereon an antenna 912. Moreover, enclosure 901 has an exit station that is implemented by an Electronic Article Surveillance (EAS) station 915. EAS station 915 includes an EAS alarm 919, and has installed thereon an antenna 916. A cash register 917 is also provided, whether a POS station 918 is provided or not.

Figure 10:
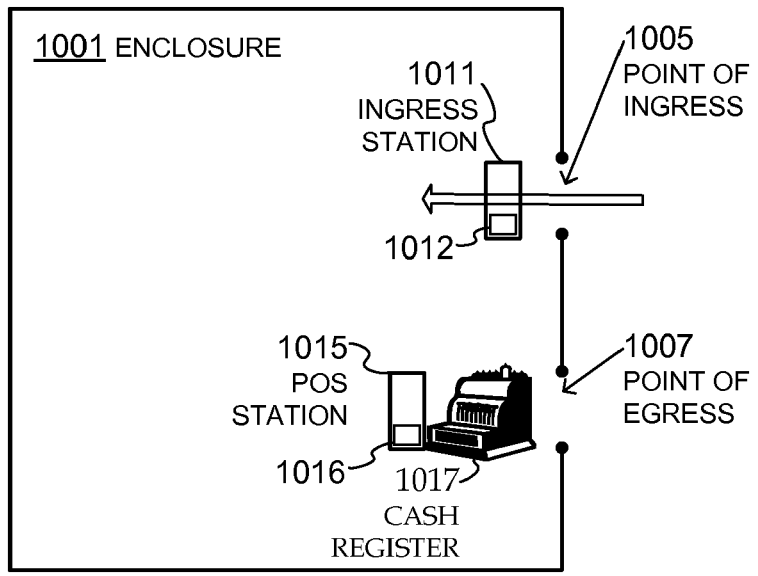
FIG. 10 is a plan view of premises according to embodiments, in which an exit station is implemented by a Point-Of-Sale (POS) station according to embodiments, and which further lacks a separate EAS station or EAS portal.

FIG. 10 is a plan view of premises according to embodiments, in which an enclosure 1001 has a point of ingress 1005, and a point of egress 1007. An ingress station 1011 is near point of ingress 1005, and has installed thereon an antenna 1012. Moreover, enclosure 1001 has an exit station that is implemented by a Point-Of-Sale (POS) station 1015. POS station 1015 includes a cash register 1017, and has installed thereon an antenna 1016. In these embodiments, POS station 1015 is located so close to point of egress 1007, that a separate EAS station or EAS portal is not needed, and therefore not provided.

In other embodiments, the incoming code and the exiting codes are read via the same antenna of the RFID reader system. This takes place where persons are permitted to use the same doors for entry and exit. These persons can be workers at a warehouse or distribution center. Or these persons can be customers at a retail site. An example is now described.

Figure 11:
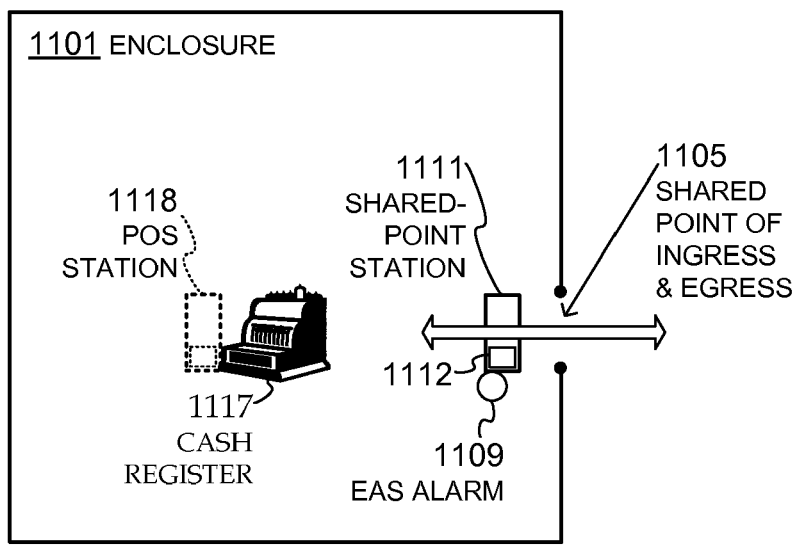
FIG. 11 is a plan view of premises according to embodiments in which a point of ingress and a point of egress are shared.

FIG. 11 is a plan view of premises according to embodiments in which an enclosure 1101 has at least one shared point of ingress and egress 1105. While only one such point is shown, more can be provided. A shared point station 1111 is near shared point of ingress and egress 1105, and has installed thereon an antenna 1112. Shared point station 1111 is implemented at least as an EAS station, and further includes an EAS alarm 1109. A cash register 1117 is also provided, whether a POS station 1118 is provided or not.

At shared point of ingress and egress 1105, antenna 1112 reads codes of tags that are both incoming and exiting. These are also called passing codes. According to some embodiments, a particular code of a particular RFID tag is read while being transported by a person, and a direction of travel has been detected for the particular tag. In other words, it is determined whether the particular tag is entering or exiting enclosure 1101. Accordingly, the corresponding passing code can be characterized as incoming or exiting, from the detected direction of travel.

The tag travel direction can be determined in any number of ways, using just one or multiple antennas at the point of interest. In some embodiments, the direction of travel is detected from two or more measurements of the same tag code.

The two measurements can be contrasted in terms of their difference in Received Signal Strength Indicator (RSSI). For example, as a tag travels away from antenna 1112, its RSSI will be decreasing, between the two measurements. Equally, as that tag travels towards antenna 1112, its RSSI will be increasing.

The two measurements can alternately be contrasted in terms of their difference in phase. For example, there can be a difference in phase between the two times the code is read. The phase will change clockwise on approach, and counter-clockwise on departure from an antenna.

In some embodiments, the phase metric can include a difference in a phase change between two points of a packet of a single tag response. As such, an individual code is measured twice by the same antenna, at two different points.

In other embodiments, one or more antennas can sense whether a tag or group of tags has crossed its mid-plane, which would be situated at shared point of ingress and egress 1105. Examples are described in copending, commonly owned U.S. patent application Ser. No. 11/818,810, filed on Jun. 14, 2007, which is hereby incorporated by reference.

In some embodiments, instead of one antenna at shared point of ingress and egress 1105, there can be a pair of antennas. Each of the antennas in the pair can be at an angle ("canted") from the direction of the path. Their number of reads, or singulations, will be different for each of the antennas of the pair, which detects the direction relative to the pair. In addition, the RSSI profiles of the singulations will be different, which again detects the direction relative to the pair.

In some embodiments, instead of one antenna, there can be a pair of antennas, each facing shared point of ingress and egress 1105, but in opposite directions along the walking path. In such embodiments, the point of ingress or egress or both is not a point or a plane, but actually a short walkway. As a person crosses shared point of ingress and egress 1105 traveling in either direction, he is walking away from one antenna and towards the other, which is a good way to correlate the antenna results.

Such techniques have been described for determining direction of travel. These techniques can also be used not necessarily for so determining, but getting more accurate reads of the incoming codes and the exiting codes, while suppressing stray reads, and so on. Such as applicable for both shared point of ingress and egress 1105, and also points of unidirectional travel, such as points 1005, 1007.

Embodiments of the RFID reader systems are now described in more detail. More particularly, whole systems can be provided, or mere components that provide the functionalities described in this document. Such components can be provided as the above-described operational processing block, a chip, a processor, and so on.

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination.

An economy is achieved in the present document in that a single set of flowcharts is used to describe methods in and of themselves, along with operations of hardware and/or software and/or firmware. This is regardless of how each element is implemented.

Methods are now described more particularly according to embodiments.

Figure 12:
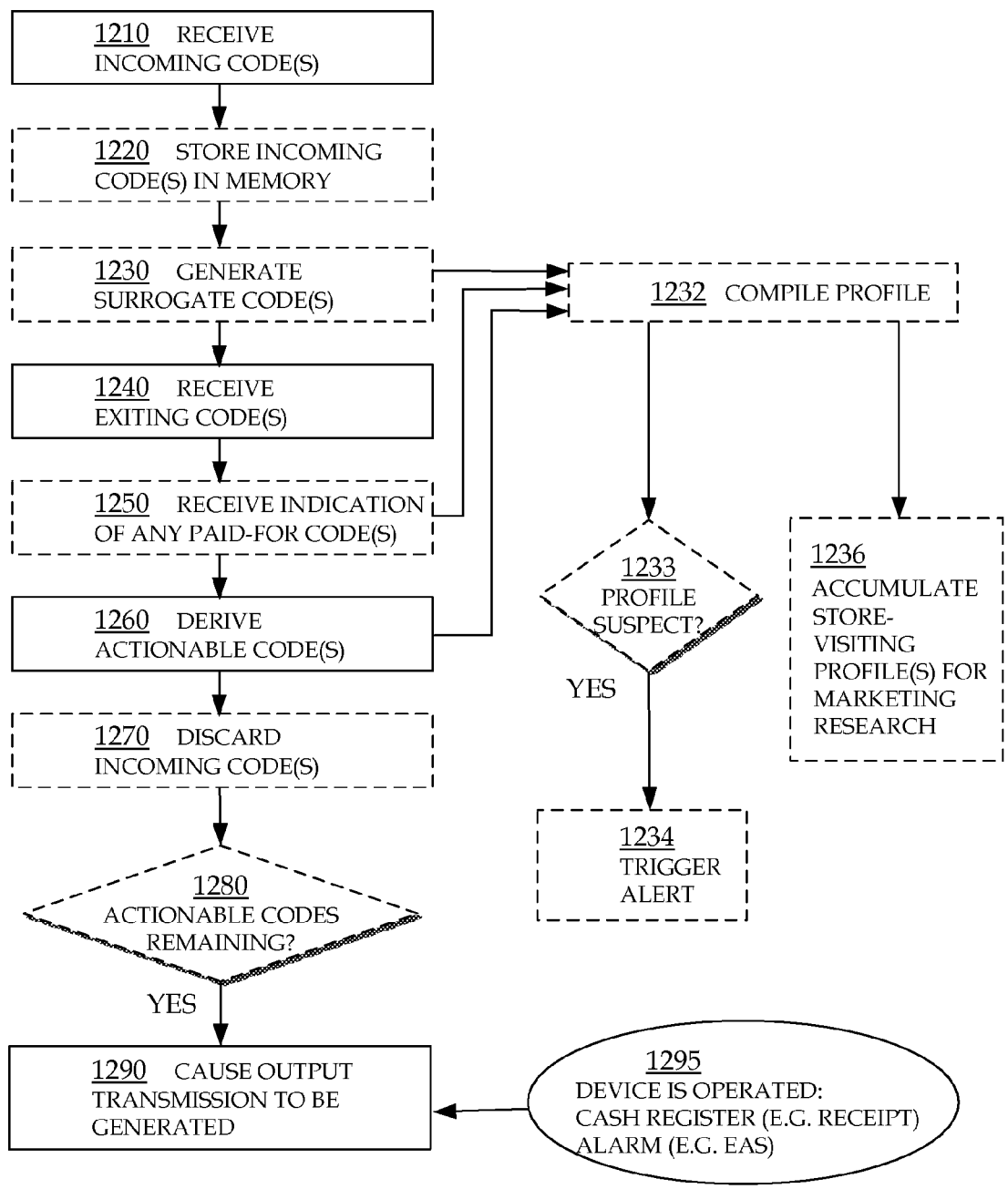
FIG. 12 is a flowchart for illustrating methods according to embodiments.

FIG. 12 is flowchart 1200 illustrating a method according to an embodiment of the invention. The method of flowchart 1200 is for a Radio Frequency Identification (RFID) reader system to be used in premises having an enclosure, and a plurality of items tagged with item RFID tags within the enclosure. The method of flowchart 1200 may be practiced by different embodiments of the invention, including but not limited to RFID reader systems, components and software.

At operation 1210, an incoming code is received, as a person is entering the enclosure. The incoming code is of a personal RFID tag carried by the person. The code is received by having been read by an antenna, as per the above.

At optional next operation 1220, the received incoming code is stored in a memory. In some embodiments, such storage is often without looking up information about the incoming code from publicly accessible tables, so as to protect the privacy of the person. As will be seen below, such storage is not always permanent, but often done only to the extent needed during the person's visit.

At optional next operation 1230, a surrogate code is generated from the incoming code. In some embodiments, the surrogate code is generated from the incoming code, according to a surrogate rule that renders the surrogate code unusable for looking up information about the incoming code. As will be seen later in this document, the surrogate code can be used for studying how people visit the premises of the enclosure, without gleaning individualized private information about them.

At next operation 1240, one or more exiting codes are received, as the person prepares to leave the enclosure. The exiting codes include the incoming code received at operation 1210, plus one or more item codes from item RFID tags of some of the items in the enclosure, which are being transported by the person.

At optional next operation 1250, an indication is received that one of the exiting codes is paid-for. In other words, there is authorization to remove it from the enclosure. In preferred embodiments, the indication of operation 1250 is received well before operation 1240, at which point the exiting codes are received. For example, as codes are paid for, they can be indicated as such, and be ready in a database associated with the premises. In some of these embodiments, the indication can be generated from data read from such a database associated with the premises. In other embodiments, the indication is generated from data read from the tag that has the paid-for code. For example, the tag code itself could indicate that the item has been sold.

At next operation 1260, actionable codes are derived. This may be performed in any number of ways. In some embodiments, actionable codes are derived by removing the incoming code from the exiting codes. If, at operation 1250, an indication is received that one of the exiting codes is paid-for, the actionable codes are derived by removing also the paid-for code from the exiting codes. Operation 1260 is described in more detail later in this document. In addition, other groups of codes may be derived.

At optional next operation 1270, the incoming codes can be discarded, from having been stored at operation 1220. Discarding means, therefore, that they are no longer stored in memory, from where they could be looked up. The discarding of operation 1270 is aimed to increase privacy of the persons coming onto and leaving the enclosure of the premises. It will be appreciated that the incoming codes were stored until they could be used to derive the actionable codes. After that, however, they are not needed.

In some embodiments, the incoming code is discarded, even if it has not been removed from any exiting codes. This can take place, for example, when a store closes. The incoming code may have exited, but been missed. Or if a timeout occurs, for example for premises that operate around the clock.

At optional next operation 1280, it is inquired whether there are any actionable codes. Some may be remaining or none, depending on what the person is doing, and on the application, namely POS or EAS. If there are no actionable codes, nothing further need happen.

If there are actionable codes, then according to next operation 1290, an output transmission is caused to be generated responsive to the actionable codes. According to comment 1295, the output transmission causes a device to be operated, such as device 717.

Deriving the actionable codes is now described in more detail, using the following examples.

Figure 13:
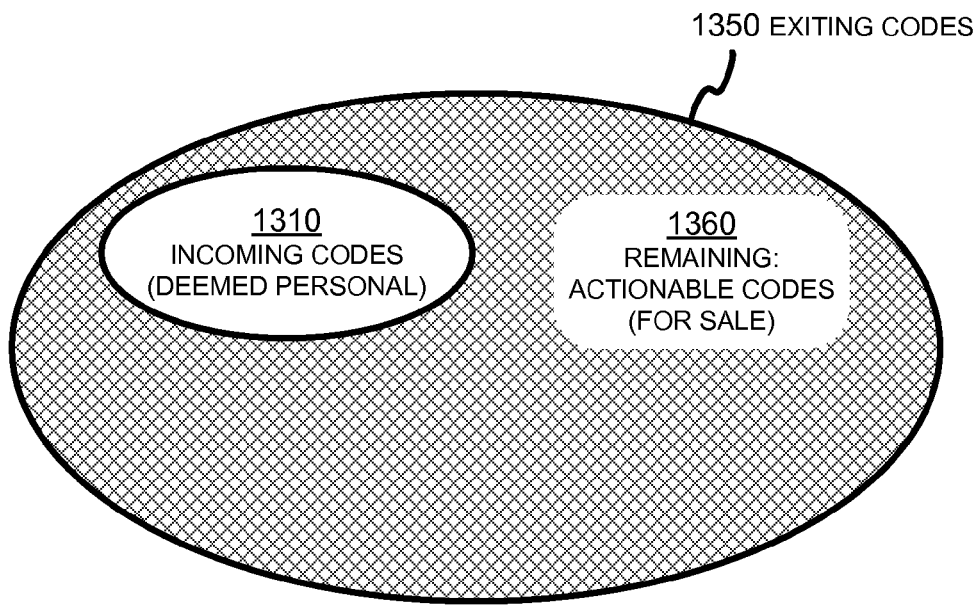
FIG. 13 is a diagram for illustrating how actionable codes can be derived for an operation of the method of FIG. 12, as applied to a POS station according to an embodiment.

FIG. 13 is a Venn diagram for illustrating how actionable codes can be derived for operation 1260 of flowchart 1200, as applied to a POS station according to an embodiment. All exiting codes in set 1350 include incoming codes in subset 1310, which are deemed personal and thus not actionable. After removing the incoming codes in subset 1310, the remaining codes 1360 are considered actionable codes. In this instance, the actionable codes are intended for sale.

Figure 14:
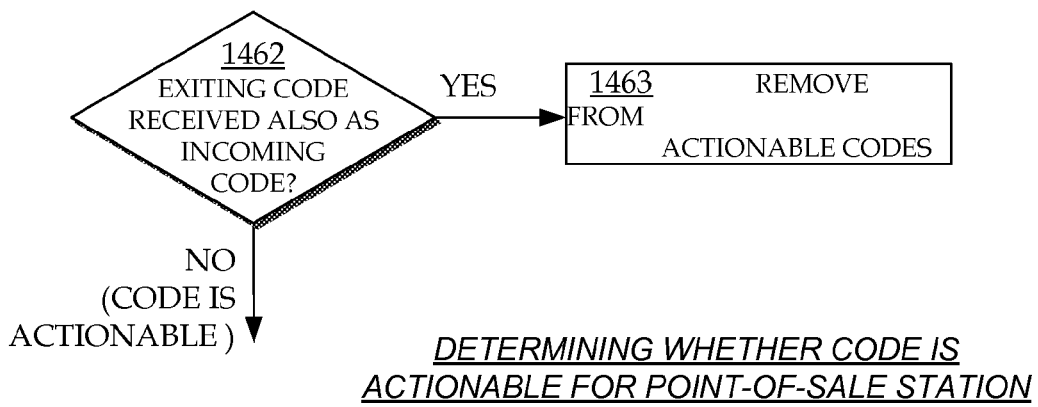
FIG. 14 is an embodiment of a flowchart segment for the derivation of FIG. 13, as applied to a single exiting code.

FIG. 14 is an embodiment of a flowchart segment 1460, for the derivation of FIG. 13, as applied to a single exiting code in set 1350. Segment 1460 is preferentially applied to all exiting codes in set 1350.

At operation 1462, it is inquired whether the exiting code in question was received also as an incoming code in subset 1310. If yes, then according to an operation 1463, the exiting code is removed from the actionable codes. If not, then the exiting code remains in subset 1360, and is therefore actionable.

FIG. 15 is a Venn diagram for illustrating how actionable codes can be derived for operation 1260 of flowchart 1200, as applied to a POS station according to an embodiment. All exiting codes in set 1550 include incoming codes in subset 1510. After removing the incoming codes in subset 1510, and also removing inconsistent codes in subset 1520, the remaining codes 1560 are considered actionable codes. In this instance, the actionable codes are intended for sale. So, a sales report will be generated for them, a receipt, and so on.

Inconsistent codes in subset 1520 are those codes that are received as exiting codes, but which are further not consistent with the native codes of the item RFID tags in the enclosure. As such, either they have been read incorrectly, or are codes of personal tags, but which were accidentally not read when the person was entering the enclosure. Such codes are also deemed likely personal, and can thus also be treated as not actionable.

FIG. 16 is an embodiment of a flowchart segment 1660, for the derivation of FIG. 15, as applied to a single exiting code in set 1550. Segment 1660 is preferentially applied to all exiting codes in set 1550.

At operation 1662, it is inquired whether the exiting code in question was received also as an incoming code in subset 1510. If yes, then according to an operation 1663, the exiting code is removed from the actionable codes.

If not, then the exiting code may be actionable. Then, at a next operation 1665, it is inquired whether the exiting code in question is inconsistent with codes of the item RFID tags in the enclosure. For example, it could correspond to items that are not in the enclosure in the first place.

The inquiry of operation 1665 can be performed by checking with a database such as database 718, but only as to whether there is a match. This way, the inquiry can still be performed without learning information about what the tag code stands for.

If the exiting code in question is inconsistent with codes of the item RFID tags in the enclosure, then according to an operation 1667, the exiting code belongs in subset 1520, and is thus removed from the actionable codes. If not, then the exiting code remains in subset 1560, and is therefore actionable.

In addition to removing incoming codes in subset 1510, and inconsistent codes in subset 1520, other codes may also be removed under other rules, and depending on the application.

FIG. 17 is a Venn diagram for illustrating how actionable codes can be derived for operation 1260 of flowchart 1200, as applied to an EAS station according to an embodiment. All exiting codes in set 1750 include incoming codes in subset 1710. After removing the incoming codes in subset 1710, and also removing paid-for codes in subset 1730, the remaining codes 1760 are considered actionable codes. In this instance, the actionable codes are deemed as being removed without authorization. So, an alarm can be generated and so on.

Paid-for codes in subset 1730 are those codes that are received as exiting codes, but which are further indicated as paid-for. Indicating may be performed as described above. Such codes are therefore not actionable in the EAS application.

FIG. 18 is an embodiment of a flowchart segment 1860, for the derivation of FIG. 17, as applied to a single exiting code in set 1750. Segment 1860 is preferentially applied to all exiting codes in set 1750.

At operation 1862, it is inquired whether the exiting code in question was received also as an incoming code in subset 1710. If yes, then according to an operation 1863, the exiting code is removed from the actionable codes.

If not, then the exiting code may be actionable. Then, at a next operation 1865, it is inquired whether the exiting code in question is indicated as paid-for. If yes, then according to an operation 1867, the exiting code belongs in subset 1730, and is thus removed from the actionable codes. If not, then the exiting code remains in subset 1760, and is therefore actionable.

In addition to removing incoming codes in subset 1710, and paid-for codes in subset 1730, other codes may also be removed under other rules, and depending on the application. For example, it is preferred that inconsistent codes be also removed, such as those in subset 1520 of FIG. 15.

Returning to FIG. 12, additional uses are now described for data about persons. It is highly preferred that the data be derived from the surrogate codes generated at operation 1230, but not necessary. In fact, such data may be derived by the incoming codes, and still preferably not be used to look up private information about the persons. The data from the incoming codes can be combined with additional circulation data about when a tag entered a store, and through which gate, and so on.

Information can be derived from how the surrogate rule is constructed. In some embodiments of the surrogate rule, the surrogate code is the same every time the incoming code is received. This way, a repeat visitor may be identified, still without learning about them the type of data that their personal RFID tag would reveal. Repeat visitors are, of course, largely already identified these days, as store customers voluntarily identify themselves to receive shopping privileges, since they visit frequently. In other embodiments of the surrogate rule, the surrogate code is different, even if generated from the same incoming code. It can even be a serial number, identifying the clients or the personal tags in order of entering the premises for the day.

At optional operation 1232, a store visiting profile is compiled, either from the incoming code or the surrogate code. In addition to the privacy considerations mentioned above, a surrogate code can be conveniently shorter. For example, it may have only 12 bits instead of 92. And it can have the additional circulation data.

The profile can be compiled from a variety of data, and their possible combinations. For example, it can be compiled from a number of times that the incoming code was received or removed, from the paid-for codes, from the exiting codes, from the actionable codes, and so on. For another example, it can be compiled from a duration between receiving the incoming code, and removing it from the exiting codes.

At optional next operation 1233, it can be inquired whether the profile is deemed suspect. Suspect can be defined by various metrics of such a profile, in a totally automated way. Such metrics can include behavior numbers, and a profile can be deemed suspect if one of these behavior numbers exceeds a threshold.

At optional next operation 1234, an alert is caused to be triggered, if the profile is deemed suspect at operation 1233. The alert could be used to notify authorities, and so on.

At a different operation 1236, the profile can be added to other such compiled profiles. This will result in accumulated profiles, which can assist in marketing and other research. After that time, the code can be discarded, if only the profile is needed.

A method is now described, for premises to use a Radio Frequency Identification (RFID) reader system. Such premises have an enclosure, and a plurality of items tagged with item RFID tags within the enclosure, as described above with reference at least to FIG. 7.

The method includes reading at least one incoming code of a personal RFID tag carried by the person, as the person is entering the enclosure. This can be performed as described above, via antennas of the RFID reader system.

The method also includes reading one or more exiting codes from the person, as he prepares to leave the enclosure. The exiting codes include the previously read incoming code, plus item codes from item RFID tags of some of the items being transported by the person.

The method moreover includes deriving actionable codes, by removing the incoming code from the exiting codes. This can be performed as described above, with potentially additional codes being removed, such as inconsistent codes, paid-for codes, and so on.

The method further includes generating an output transmission responsive to the actionable codes. The output transmission can be caused to be generated as described above.

The method also includes operating a device, such as device 717, responsive to the output transmission. This can be performed as also indicated by comments 1295. Additional possibilities for the method have been described above.

Figure 19:
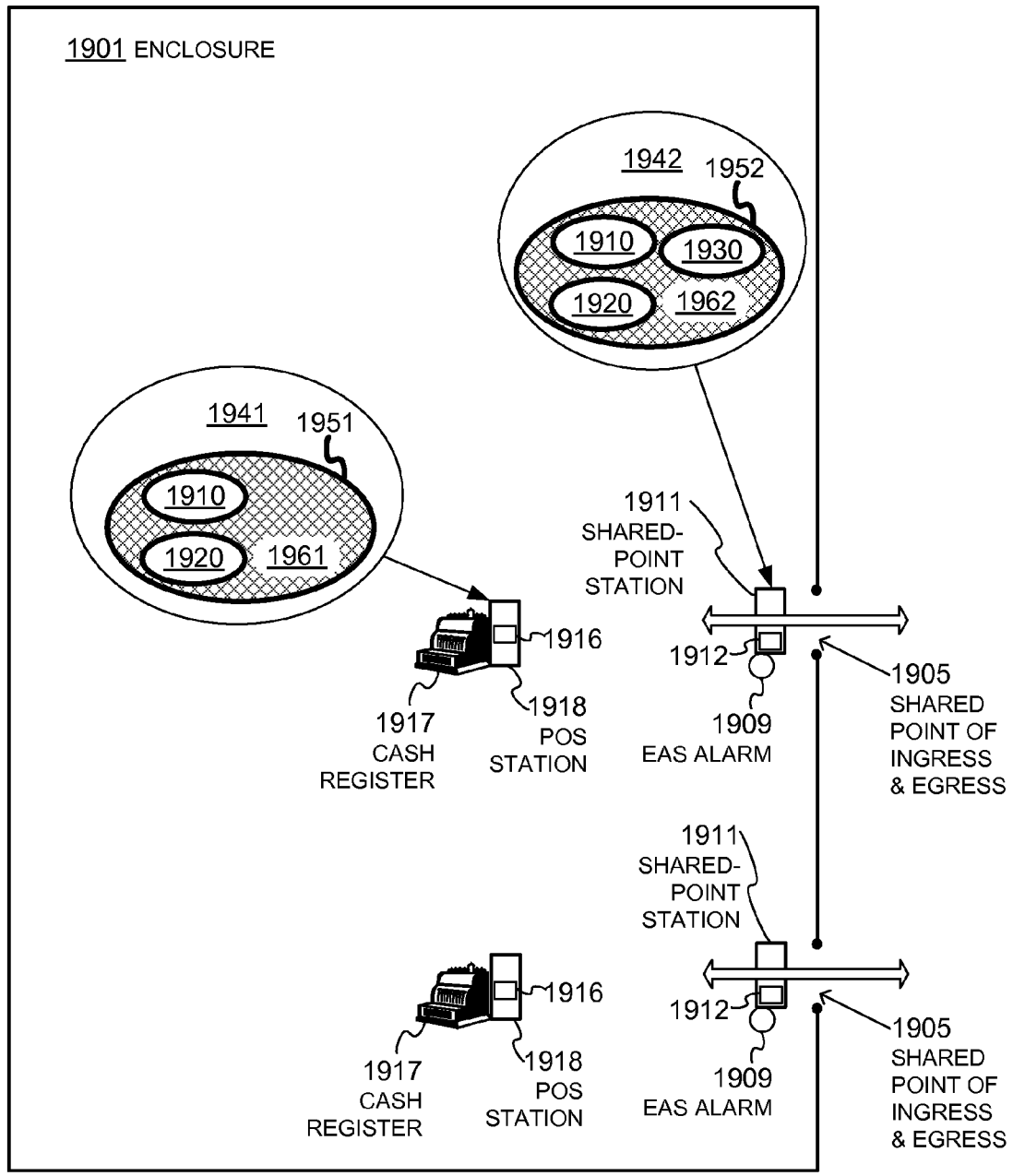
FIG. 19 is a diagram of a dual POS and EAS application for premises according to embodiments.

Referring to FIG. 19, a dual POS and EAS application is now described, which uses elements of the invention in combination.

Enclosure 1901 has multiple shared points of ingress & egress 1905. Corresponding to each, there are shared-point stations 1911, respectively. Each of those has an RFID reader antenna 1912, and an EAS alarm 1909. In addition, there are POS stations 1918, with cash registers 1917, and RFID reader antennas 1916.

At points 1905, antennas 1912 read codes, which are then characterized as either incoming codes 1910 or exiting codes 1952. Characterizing is performed by applying a travel direction determination feature, as described above.

At POS station 1918, antennas 1916 read exiting codes 1951. From those, according to comment 1941, first actionable codes 1961 are derived by removing incoming codes 1910, plus any inconsistent codes 1920. These first actionable codes 1961 are then reported to cash registers 1917 for payment. These first actionable codes 1961 can now be reported into the RFID reader system as paid-for codes 1930, preferably upon confirming receipt of payment.

At points 1905, according to comment 1942, second actionable codes 1962 are derived by removing incoming codes 1910, any inconsistent codes 1920, and any indicated paid-for codes 1930. These second actionable codes 1962 are then reported to EAS alarm 1909 for notification.

After clearing EAS alarm 1909, the incoming codes 1910 can be discarded.

An advantage of some embodiments is that it is not required to operate on tags, silence tags, or remove tags at the point of sale, for the EAS system to work. Some prior art schemes require these additional actions.

It is believed that premises such as those described in this document remain vulnerable to theft of the items. After all, that is what the EAS embodiments are for. The invention goes a long way in solving problems with EAS systems, and relieving premises operators from unnecessary burdens.

When examining threat scenarios, it can be envisioned that intended thieves might become sophisticated, for evading EAS systems. One threat scenario, also called the destruction scenario, envisions that a relatively sophisticated thief will somehow silence or remove or destroy the legitimate RFID tag of an item they intend to steal. Then they could exit with the item, pretending it was theirs and they had brought it into the premises.

It is believed that the destruction scenario makes assumptions that can be thwarted, and therefore that the risk can be alleviated. For example, the items can be tagged so that it is hard to remove the tags from them. For example, where a high-value item such as electronic equipment is provided in a box, the tag can be placed inside the box. The box can be marked on the outside indicating where on the inside the tag is, for near-field reading. Additionally, passwords within a tag can prevent it from being silenced.

Plus, physically handling an item for its tag can be observed. Moreover, a visual inspection of exiting persons could still be included, however cursory. For example, images can be retrieved from the exiting tags, and displayed in a monitor at a Point of Sale. If a TV is leaving the store but its image is not displayed, the scenario can be thwarted.

If the destruction scenario is not thwarted, however, it is probably not stopped by the present invention. Equally, it would not be stopped by other schemes that rely on reading the legitimate tag.

Curiously, the invention would probably also not stop another scenario, called the substitution scenario. In that, a highly sophisticated thief would surreptitiously read the RFID code of the legitimate tag of an item they intend to steal, using their own reader. They might do this during a first visit to the premises. Then they would prepare a counterfeit tag, which has a code that is a duplicate of the code of the legitimate tag. Then they would make a second visit to the premises, at which time they would substitute on the item the counterfeit tag for the legitimate tag. Plus, they would still also have to somehow silence or remove or destroy the legitimate tag, as they would in the destruction scenario. Then they would exit with the item, pretending it was theirs and they had brought it into the premises. In that case, the duplicate tag will be read as an incoming tag, and therefore not be treated as an actionable tag.

It will be observed that the substitution scenario calls for far more sophistication than the destruction scenario, for probably little additional benefit. As such, the substitution scenario would likely not be used, since the destruction scenario also works.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. A Radio Frequency Identification (RFID) reader system for use in premises having an enclosure and a plurality of items tagged with item RFID tags within the enclosure, comprising:
   one or more antennas for reading at least one incoming code of a personal RFID tag carried by a person, as the person is entering the enclosure, and for reading a plurality of exiting codes that include the incoming code and item codes from item RFID tags of some of the items being transported by the person, as the person prepares to leave the enclosure; and
   a processor for deriving actionable codes by removing the incoming code from the exiting codes, and for causing an output transmission to be generated responsive to the actionable codes.

2. The RFID reader system of claim 1, in which
   the exiting codes are read from a Point-Of-Sale station of the enclosure having a cash register, and
   the output transmission includes at least some of the actionable codes for generating a sales report for the cash register.

3. The RFID reader system of claim 1, in which
   the exiting codes are read from an Electronic Article Surveillance station of the enclosure,
   an alarm is provided for notifying when one of the items is being removed from the enclosure without authorization from an operator of the enclosure, and
   the output transmission causes the alarm to be activated.

4. The RFID reader system of claim 3, in which
   the alarm is located at the Electronic Article Surveillance station.

5. The RFID reader system of claim 3, in which
   the alarm is located at a place other than the Electronic Article Surveillance station.

6. The RFID reader system of claim 3, in which
   the alarm includes one of a light and a speaker.

7. The RFID reader system of claim 3, in which
   the alarm includes a display monitor.

8. The RFID reader system of claim 1, in which
   the incoming code has been read via a first antenna of the RFID reader system, and
   the exiting codes have been read via a second antenna of the RFID reader system distinct from the first antenna.

9. The RFID reader system of claim 1, in which
   the incoming code and the exiting codes have been read via the same antenna of the RFID reader system.

10. The RFID reader system of claim 1, in which
    a passing code of a particular RFID tag was read while being transported by a person,
    a direction of travel is detected for the particular tag, and the passing code is characterized as one of incoming and exiting from the detected direction of travel.

11. The RFID reader system of claim 1, in which
one of the exiting codes is determined to be inconsistent with codes of the item RFID tags, and
the actionable codes are derived by further removing from the exiting codes the inconsistent code.

12. The RFID reader system of claim 1, in which
an indication is received that one of the exiting codes is paid-for, and
the actionable codes are derived by removing also the paid-for code from the exiting codes.

13. The RFID reader system of claim 12, in which
the indication is generated from data read from the tag having the paid-for code.

14. The RFID reader system of claim 12, in which
the indication is generated from data read from a database associated with the premises.

15. The RFID reader system of claim 12, in which
one of the exiting codes is determined to be inconsistent with codes of the item RFID tags, and
the actionable codes are derived by further removing from the exiting codes the inconsistent code.

16. The RFID reader system of claim 12, in which
the exiting codes are read from an Electronic Article Surveillance station of the enclosure,
an alarm is provided for notifying when one of the items is being removed from the enclosure without authorization from an operator of the enclosure, and
the output transmission causes the alarm to be activated.

17. The RFID reader system of claim 16, in which
one of the exiting codes is determined to be inconsistent with codes of the item RFID tags, and
the actionable codes are derived by further removing from the exiting codes the inconsistent code.

18. The RFID reader system of claim 16, in which
after removing the incoming code and the paid-for code, there are no actionable codes, and the alarm is therefore not activated.

19. The RFID reader system of claim 1, in which
the incoming code is discarded without looking up information about it from a database.

20. The RFID reader system of claim 19, in which
the incoming code is discarded before the output transmission is caused to be generated.

21. The RFID reader system of claim 19, in which
a surrogate code is generated from the incoming code, according to a surrogate rule that renders the surrogate code unusable for looking up information about the incoming code.

22. The RFID reader system of claim 19, in which
the incoming code is discarded, even if it has not been removed from any exiting codes.

23. The RFID reader system of claim 1, in which
a store visiting profile is compiled from the incoming code.

24. The RFID reader system of claim 23, in which
a surrogate code is generated from the incoming code, according to a surrogate rule that renders the surrogate code unusable for looking up information about the incoming code, and
the profile is compiled from the surrogate code.

25. A method for a Radio Frequency Identification (RFID) reader system to be used in premises having an enclosure and a plurality of items tagged with item RFID tags within the enclosure, comprising:

receiving, as a person is entering the enclosure, at least one incoming code of a personal RFID tag carried by the person;
receiving, as the person prepares to leave the enclosure, a plurality of exiting codes that include the incoming code and item codes from item RFID tags of some of the items being transported by the person;
deriving actionable codes by removing the incoming code from the exiting codes; and
causing an output transmission to be generated responsive to the actionable codes.

26. The method of claim 25, in which
the exiting codes are received from a Point-Of-Sale station of the enclosure having a cash register, and
the output transmission includes at least some of the actionable codes for generating a sales report for the cash register.

27. The method of claim 25, in which
the exiting codes are received from an Electronic Article Surveillance station of the enclosure,
the output transmission causes to be activated an alarm for notifying when one of the items is being removed from the enclosure without authorization from an operator of the enclosure.

28. The method of claim 27, in which
the alarm includes one of a light and a speaker.

29. The method of claim 27, in which
the alarm includes a display monitor.

30. The method of claim 25, in which
the incoming code has been read via a first antenna of the RFID reader system, and
the exiting codes have been read via a second antenna of the RFID reader system distinct from the first antenna.

31. The method of claim 25, in which
the incoming code and the exiting codes have been read via the same antenna of the RFID reader system.

32. The method of claim 25, in which
a passing code of a particular RFID tag was read while being transported by a person,
a direction of travel is detected for the particular tag, and
the passing code is characterized as one of incoming and exiting from the detected direction of travel.

33. The method of claim 25, in which
one of the exiting codes is determined to be inconsistent with codes of the item RFID tags, and
the actionable codes are derived by further removing from the exiting codes the inconsistent code.

34. The method of claim 25, further comprising:
an indication is received that one of the exiting codes is paid-for, and
the actionable codes are derived by removing also the paid-for code from the exiting codes.

35. The method of claim 34, in which
the indication is generated from data read from the tag having the paid-for code.

36. The method of claim 34, in which
the indication is generated from data read from a database associated with the premises.

37. The method of claim 34, in which
one of the exiting codes is determined to be inconsistent with codes of the item RFID tags, and
the actionable codes are derived by further removing from the exiting codes the inconsistent code.

38. The method of claim 34, in which
the exiting codes are received from an Electronic Article Surveillance station of the enclosure,
an alarm is provided for notifying when one of the items is being removed from the enclosure without authorization from an operator of the enclosure, and
the output transmission causes the alarm to be activated.

39. The method of claim 38, in which
one of the exiting codes is determined to be inconsistent with codes of the item RFID tags, and
the actionable codes are derived by further removing from the exiting codes the inconsistent code.

40. The method of claim 25, further comprising:
discarding the incoming code without looking up information about it from a database.

41. The method of claim 40, in which
the incoming code is discarded before the output transmission is generated.

42. The method of claim 40, in which
the incoming code is discarded, even if it has not been removed from any exiting codes.

43. The method of claim 25, further comprising:
compiling a store visiting profile from the incoming code.

44. The method of claim 43, in which
the profile is compiled from a number of times that the incoming code was received or removed.

45. The method of claim 43, in which
the profile is compiled from a duration between receiving the incoming code and removing it from the exiting codes.

46. The method of claim 43, further comprising:
causing an alert to be triggered, if the profile includes a behavior number that exceeds a threshold.

47. An article comprising: a storage medium, the storage medium having instructions stored thereon, in which when the instructions are executed by at least an RFID reader system component used in association with premises having an enclosure and a plurality of items tagged with item RFID tags within the enclosure, the instructions result in:
receiving, as a person is entering the enclosure, at least one incoming code of a personal RFID tag carried by the person;
receiving, as the person prepares to leave the enclosure, a plurality of exiting codes that include the incoming code and item codes from item RFID tags of some of the items being transported by the person;
deriving actionable codes by removing the incoming code from the exiting codes; and
causing an output transmission to be generated responsive to the actionable codes.

* * * * *

UNITED STATES PATENT AND TRADEMARK OFFICE
CERTIFICATE OF CORRECTION

PATENT NO. : 7,696,882 B1 Page 1 of 1
APPLICATION NO. : 12/018937
DATED : April 13, 2010
INVENTOR(S) : Rahimi et al.

It is certified that error appears in the above-identified patent and that said Letters Patent is hereby corrected as shown below:

Please delete "be also" on column 17, line 41 and insert --also be-- therefor.

Please delete "The incoming code can be read via a first antenna, while the exiting codes have been read via a second a" on column 11, line 61 and insert --The incoming code can be read via a first antenna, while the exiting codes have been read via a second antenna.-- therefor.

Signed and Sealed this

Twenty-eighth Day of September, 2010

David J. Kappos
*Director of the United States Patent and Trademark Office*